April 18, 1961  J. G. BURNS  2,980,055
REVOLUTION INDICATING DIAL
Filed April 4, 1958  2 Sheets-Sheet 1
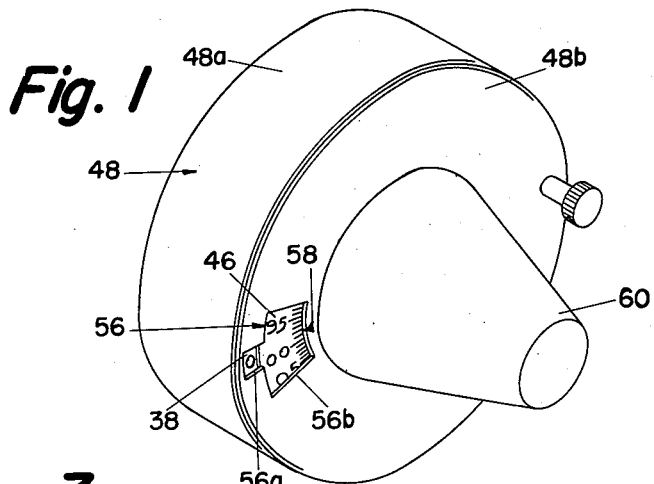
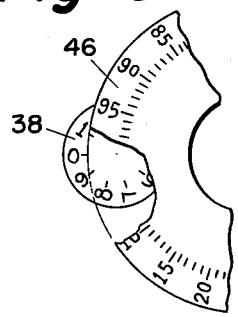
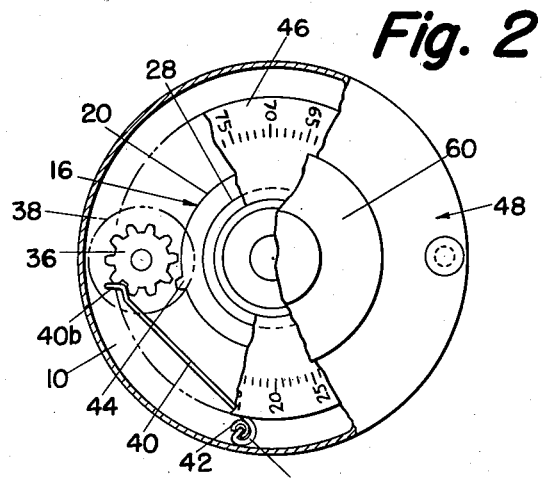
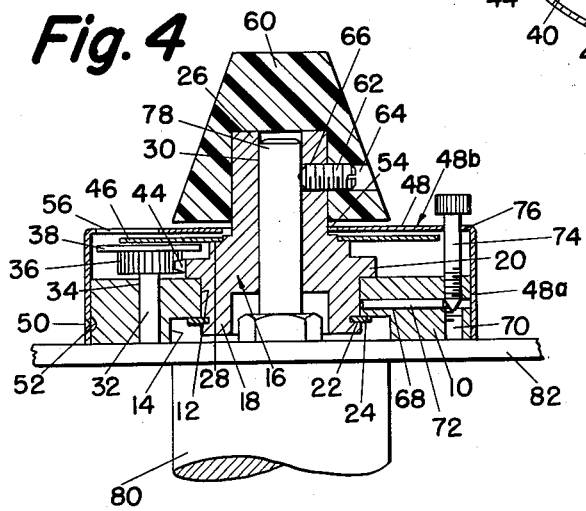
INVENTOR.
JEROME G. BURNS
BY
*Donald S. Cohen*
ATTORNEY April 18, 1961   J. G. BURNS   2,980,055
REVOLUTION INDICATING DIAL
Filed April 4, 1958   2 Sheets-Sheet 2

INVENTOR.
JEROME G. BURNS
BY
Donald S. Cohen
ATTORNEY

United States Patent Office 2,980,055
Patented Apr. 18, 1961

2,980,055

REVOLUTION INDICATING DIAL

Jerome G. Burns, Upper Darby, Pa., assignor to International Resistance Company, Philadelphia, Pa.

Filed Apr. 4, 1958, Ser. No. 726,503

9 Claims. (Cl. 116—115)

This invention relates to the construction of a rotatable shaft position indicating dial. More particularly it relates to a dial for indicating the number of revolutions and/or fraction of a revolution through which the shaft has been rotated.

There are many electrical instruments, such as potentiometers, which are actuated by a multiturn rotatable shaft. For such instruments it is necessary to know the position of the shaft, i.e. the number of revolutions and/or fraction of a revolution which the shaft has been rotated, in order to know the setting of the instrument. In general, this has previously been accomplished by a mechanism incorporated into a knob which is attached to the shaft and which includes at least two numbered dials connected together by suitable gearing. One of the dials is used to indicate the fraction of a revolution and the other dial the number of revolutions with the fraction dial actuating the revolution dials once every revolution of the shaft. A problem with such indicating dials heretofore available is that the actuating mechanism between the dials causes an ambiguity in reading the dials. In such dials it has been found that it requires approximately 25 degrees of rotation of the fraction dial to rotate the turns dial from one reading to the next. If the fraction dial is divided into 100 parts, it will have to start to rotate the turns dial at a reading of approximately 93 so that the turns dial will change from one reading to the next by the time the fraction dial reaches a reading of 100 or 0, the start of the next revolution. Thus, when the fraction dial reads between 93 and 100, the turns dial will be between two readings. Therefore, during this time it is not immediately obvious when looking at the dial what the reading of the dial is so as to create the ambiguity. In addition to providing a clear and obvious reading at all times, these indicating dials must be small in size and be made up of a minimum number of parts so as to be easy to assemble and inexpensive.

It is therefore an object of this invention to provide an indicating dial which is clearly readable at all times. It is a further object of this invention to provide an indicating dial in which the turns dial is actuated during only approximately 1% of the revolution of the fraction of a revolution dial. It is another object of this invention to provide an indicating dial in which the dial reading the number of revolutions is actuated from one reading to the next partially by the fraction of a revolution dial and partially by a snap action spring. It is still another object of this invention to provide an indicating dial which is small in size and has a minimum number of parts so as to be easy to assemble and inexpensive. Other objects of the invention will in part be obvious and will in part appear hereinafter.

The invention accordingly comprises the features of construction, combinations of elements and arrangement of parts, which will be exemplified in the constructions hereinafter set forth and the scope of the invention will be indicated in the claims.

For a fuller understanding of the nature and objects of the invention, reference should be had to the following detailed description taken in connection with the accompanying drawings in which:

Figure 1 is a perspective view of the indicating dial of this invention;

Figure 2 is a front elevation view of the indicating dial with the cover and dial plates partially broken away;

Figure 3 is a front view of the portion of the dial plates broken away from Figure 2;

Figure 4 is a cross-sectional view of the indicating dial;

Figure 5:
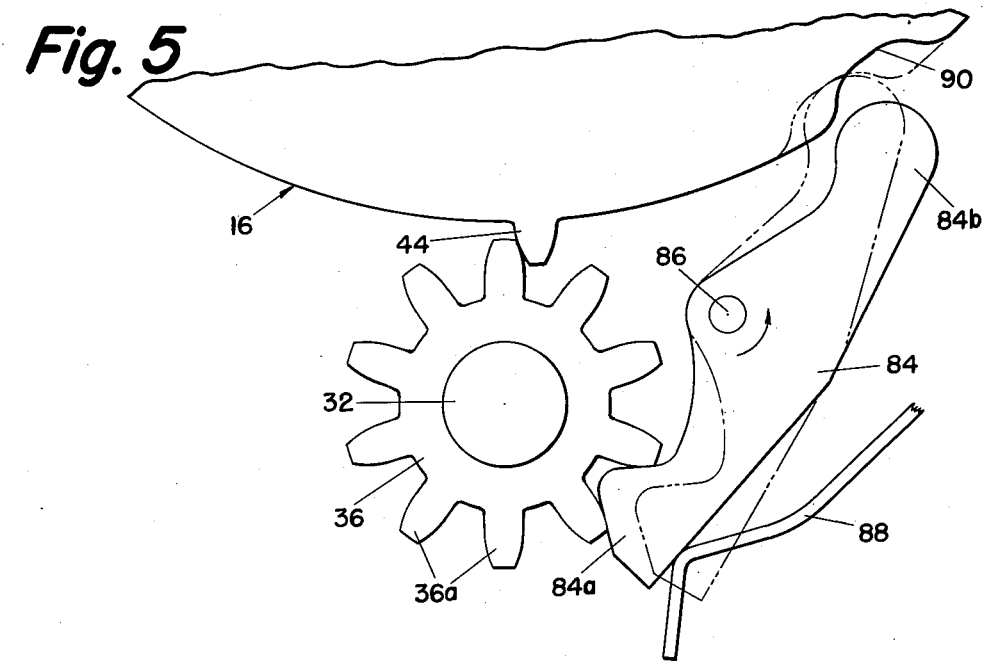
Figure 5 is an enlarged view of a modification of the spring actuating and locking mechanism.

Referring to Figure 4 of the drawing the indicating dial of this invention comprises a circular base plate 10 having a central aperture 12 therethrough and a counterbore 14 in the bottom surface thereof surrounding aperture 12. A spindle 16 has a bearing portion 18 at one end thereof rotatably supported in base plate aperture 12 and an annular flange 20 rotatably seated against the top surface of base plate 10. Bearing portion 18 extends into counterbore 14 and has an annular groove 22 in its surface. A snap ring 24 fits into groove 22 and seats against the bottom of counterbore 14 to secure spindle 16 in base plate 10. Spindle 16 has a knob receiving portion 26 at its other end and a stepped shoulder 28 between the knob receiving portion 26 and the annular flange 20. Spindle 16 also has a central hole 30 therethrough.

A pin 32 is force fitted into a hole 34 in base plate 10 adjacent the central aperture 12 and projects beyond the top surface of the base plate. A ten tooth gear 36 is rotatably mounted on pin 32 and a revolution indicating disk 38 is secured to the upper surface of gear 36 to rotate therewith. The top surface of revolution indicating disk 38 is provided with ten equally spaced indicia marks which are numbered from 0 through 9 (see Figure 3). A leaf spring 40 has one end 40a secured to a pin 42 which projects from the upper surface of base plate 10 and a substantially V-shaped detent 40b at its other end which extends between the teeth of gear 36 (see Figure 2). Spring 40 is held against gear 36 by its own resilience and thereby inhibits rotation of the gear. A single tooth 44 projects radially from the annular flange 20 on spindle 16 a sufficient distance to intermesh with the teeth of gear 36 once each revolution of spindle 16. The width of tooth 44 is less than the spacing between the teeth of gear 36 and the ratio of the theoretical pitch circle of tooth 44 to the pitch circle of the teeth of gear 36 is approximately 5 to 1 for reasons which will be explained later.

An annular fraction of a revolution indicating disk 46 is mounted on the step shoulder 28 of spindle 16 and is secured to the spindle either by a friction fit or by any other suitable means. Fraction indicating disk 46 is of a diameter to extend across revolution indicating disk 38 leaving only a small portion of the revolution indicating disk and the numbers thereon exposed (see Figures 1 and 3). The top surface of fraction indicating disk 46 is provided with 100 equally spaced indicia marks, every fifth mark being numbered (see Figures 2 and 3). Fraction indicating disk 46 is arranged on spindle 16 with respect to tooth 44 such that tooth 44 lies beneath the disk 46 at the point substantially between indicia marks 98 and 99 for reasons which will be explained later. A cup-shaped cover 48 extends over base plate 10 and indicating disks 38 and 46 with the rim 48a thereof fitting around the periphery of base plate 10. Cover 48 is secured to base plate 10 by projections 50 in the rim 48a extending into indentations 52 in the periphery of the base plate (see Figure 4). The bottom 48b of cover 48 has a central aperture 54 through which the knob receiving portion 26 of spindle projects. A T-shaped opening 56 is provided in the cover bottom 48b which is positioned so that the leg portion 56a thereof exposes one number on the revolutions indicating disk 38 and the cross portion 56b thereof exposes a portion of the numbers on the fraction indicating disk 46 (see Figure 1). An arrow 58 is provided on the outer surface of the cover bottom 48b next to the cross portion 56b of opening 56 to indicate the setting of fraction indicating disk 46. A knob 60 fits over the end of the knob receiving portion 26 of spindle 16 and is secured thereto by a set screw 62 threaded into aligned radially extending holes 64 and 66 in the knob 60 and knob receiving portion 26 (see Figure 4).

The indicating dial is provided with means to lock the dial at any desired setting. Referring to Figure 4, the locking means comprises a radially extending hole 68 in base plate 10 extending from its outer edge to the central aperture 12 and a threaded hole 70 in the base plate 10 perpendicular to and crossing radial hole 68. A locking pin 72 having tapered ends slidably fits in radial hole 68 and is of a length to extend from central aperture 12 to a point just within threaded hole 70. A thumb screw 74 extends through an opening 76 in cover bottom 48b and is threaded into threaded hole 70. Thumb screw 74 has a tapered end which is adapted to engage the end of locking pin 72 to force the locking pin against spindle bearing portion 18 and thereby prevent rotation of the spindle 16.

In use, the actuating shaft 78 of an electrical instrument 80, such as a potentiometer, is inserted in central hole 30 in the spindle 16 and is locked to rotate with the spindle by set screw 62. As shown in Figure 4, electrical instrument 80 is mounted on a panel 82 with its shaft 78 extending through a hole (not shown) in the panel. Prior to locking shaft 78 to spindle 16, shaft 78 is rotated to the zero setting of electrical instrument 80 and spindle 16 is rotated to provide a zero reading of indicating disks 38 and 46. With the fraction indicating disk 46 being at a zero setting, tooth 44, which is located between indicia marks 98 and 99, will be in a position just clear of the teeth of gear 36 so that spindle 16 is free to rotate clockwise, as viewed in Figure 2 for substantially a full revolution without actuating revolution indicating disk 38. During the free rotation of spindle 16, gear 36 and thereby revolutions indicating disk 38 are prevented from rotating by spring 40. When spindle 16 completes substantially a full revolution, tooth 44 will be in position to engage with the teeth on gear 36 (see Figure 2). Further rotation of spindle 16 causes tooth 44 to engage a tooth on gear 36 and thereby rotate gear 36 and revolution indicating disk 38. Rotation of gear 36 causes spring detent 40b to raise out of the space between the gear teeth and slide over the adjacent gear tooth. When gear 36 has been rotated approximately 20°, spring detent 40b will have passed over the adjacent gear tooth and since the spacing between the teeth is greater than the width of tooth 44, spring detent 40b will snap into the next space and thereby rotate gear 36 an additional 16° without any further rotation of spindle 16. Thus, gear 36 and revolution indicating disk 38 will be rotated 36° to bring the number 1 within the leg portion 56a of opening 56 in cover bottom 48b. Therefore, to change revolution indicating disk 38 from one reading to the next, spindle 16 through tooth 44 only has to rotate gear 36 through approximately 20° with spring 40 completing the actuation. Since the ratio of the theoretical pitch circle of tooth 44 to the pitch circle of the teeth of gear 36 is approximately 5 to 1, for tooth 44 to rotate gear 36 through approximately 20° by direct contact, requires only about 4° of rotation of spindle 16.

Since fraction indicating disk 46 is divided into 100 equally spaced parts, the spacing between each indicia mark is 3.6°. Therefore, by having tooth 44 engage gear 36 at a reading of fraction indicating disk 46 of between 98 and 99, gear 36 will be actuated sufficiently to change the reading of revolution indicating disk 38 from one number to the next by the time fraction indicating disk 46 has reached its zero position and is ready for the next revolution.

To lock the indicating dial at any desired setting, thumb screw 74 is rotated to thread it into threaded hole 70. This causes the end of thumb screw 74 to engage the end of locking pin 72 forcing the locking pin into tight engagement with spindle 16 and thereby prevent rotation of the spindle. To change the setting of the dial, thumb screw 74 is rotated in the reverse direction to relieve the frictional engagement between locking pin 72 and spindle 16 and thereby permit rotation of the spindle.

Figure 5 shows a modification of the spring actuating means and locking means for gear 36 which limits the rotation of gear 36 to change the reading of revolution indicating disk to one number at a time. This spring actuating means comprises a pawl 48 pivotally mounted on a pin 86 and having a tooth 84a at one end which extends between the teeth 36a of gear 36 and a rounded portion 84b at its other end which rides on the outer periphery of spindle 16. A spring 88 mounted on the base plate in the same manner as spring 40 shown in Figure 2 engages pawl 84 behind tooth 84a to resiliently urge the tooth between gear teeth 36a. Spindle 16 has a notch 90 in its outer periphery which is spaced from the single tooth 44, a distance such that when tooth 44 engages a gear tooth 36a, notch 90 is next to the rounded end 84b of pawl 84. Notch 90 and rounded pawl end 84b are below the plane of tooth 44 so that tooth 44 will pass over the rounded end of pawl 84. Pawl 84 may be tapered or have a flange at its toothed end so that pawl tooth 84a will be in a plane to extend between gear teeth 36a. In operation, when gear 36 is rotated by the engagement of tooth 44 with a gear tooth 36a, pawl tooth 84a is raised out of the space between gear 36a and slides over the adjacent gear tooth. At the time tooth 44 engages the gear tooth 36a, notch 90 is next to the rounded end 84b of pawl 84 thereby permitting pawl 84 to so pivot with the rounded end 84b moving into notch 90 as shown in dotted lines in Figure 5. When gear 36 has been rotated approximately 20°, pawl tooth 84a will have passed over the adjacent gear tooth and spring 88 will snap pawl tooth 84a into the next space between the gear teeth and thereby rotate gear 36 an additional 16° without any further rotation of spindle 16. When pawl tooth 84a is snapped into the next space between the gear teeth, the rounded end 84b of pawl 84 raises out of notch 90. Notch 90 is of a width such that any further rotation of spindle 16 moves notch 90 away from the rounded pawl end 84b so that the rounded pawl end will again ride on the outer periphery of spindle 16 and thereby prevent any further rotation of gear 36. Spindle 16 is then free to rotate through another revolution with the revolution indicating disk being locked at its reading.

Figure 6:
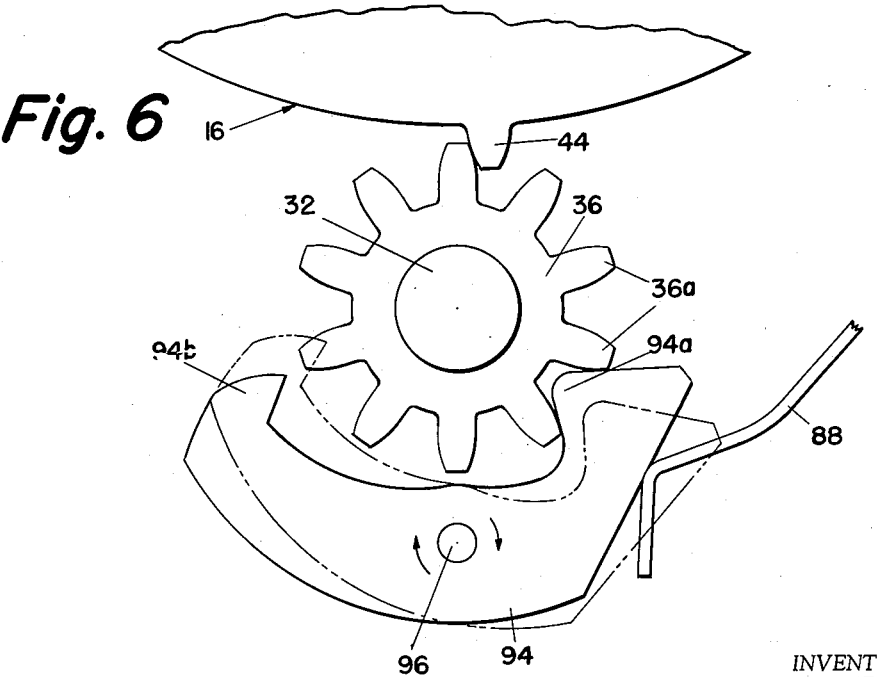
Figure 6 is an enlarged view of another modification of the spring actuating and locking mechanism.

Figure 6 shows another modification of the spring actuating and locking means for gear 36 which comprises a U-shaped pawl 94 pivotally mounted on a pin 96. Pawl 94 has teeth 94a and 94b at its ends. Pawl tooth 94a is normally resiliently held in a space between gear teeth 36a by spring 88. When gear 36 is rotated by the engagement of tooth 44 with gear teeth 36a, pawl tooth 94a is raised out of the space between gear teeth 36a and slides over the adjacent gear tooth. This pivots pawl 94 to the position shown in dotted lines, moving pawl tooth 94b into a space between the gear teeth to limit the rotation of gear 36. When gear 36 has been rotated approximately 20°, pawl tooth 94a will have passed over the adjacent gear tooth and spring 88 will snap pawl tooth 94a into the next space between the gear teeth and thereby rotate gear 36 an additional 16° without any further rotation of spindle 16. Spindle 16 is then free to rotate through another revolution with the revolution indicating disk being locked in place.

Thus, there is provided an indicating dial in which the revolution indicating disk is actuated from one number to the next during approximately the last one percent of the revolution of the fraction indicating disk so that the reading of the dial is clearly readable and unambiguous at all times. Furthermore, the indicating dial is small in size and is made up of a minimum number of parts so that it is easy to manufacture and assemble and is thereby relatively inexpensive.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. An indicating dial comprising the combination of an annular base, a spindle rotatably mounted on the center of said base, a ten tooth gear mounted on said base adjacent said spindle for rotation about an axis parallel to the axis of rotation of said spindle, a revolution indicating disk mounted on and rotatable with said gear, a single tooth extending radially outwardly from said spindle and adapted to intermesh with the teeth on said gear, said single tooth being a width less than the width of the spaces between the teeth of said gear, a fraction of a revolution indicating disk mounted on and rotatable with said spindle, said fractions of a revolution indicating disk extending over and overlapping a portion of said revolutions indicating disk, and means mounted on said base and resiliently urged between the teeth of said gear.

2. The combination as set forth in claim 1 in which the means resiliently urged between the teeth of said gear comprises a leaf spring having one end secured to said base and a detent resiliently urged between the teeth of said gear.

3. The combination as set forth in claim 1 in which said means resiliently urged between the teeth of said gear comprises a substantially U-shaped pawl pivotally mounted on said base adjacent said gear, a tooth on each end of said pawl, and spring means normally urging one of said pawl teeth between the teeth of said gear, said other pawl tooth being movable between the teeth of said gear when said one pawl tooth is urged from between the gear teeth upon rotation of said gear.

4. The combination as set forth in claim 1 in which said means resiliently urged between the teeth of said gear comprises a pawl pivotally mounted on said base adjacent said gear, one end of said pawl riding on the outer periphery of said spindle and the other end of said pawl having a tooth which is adapted to extend into the spaces between said gear teeth, spring means normally urging said pawl tooth into a space between said gear teeth and a notch in the periphery of said spindle into which said one end of said pawl moves when said pawl tooth is urged from the space between said gear teeth upon rotation of said gear.

5. The combination as set forth in claim 1 in which the ratio of the theoretical pitch circle of the single tooth on the spindle to the pitch circle of the teeth on the gear is approximately 5 to 1.

6. The combination as set forth in claim 1 including a cup-shaped cover member fitting over the base and indicating disks with the spindle extending therethrough and an opening in said cover member exposing a portion of each of said indicating disks.

7. The combination as set forth in claim 6 in which the revolution indicating disk has number indicia thereon to indicate the number of revolutions the spindle rotates, the fraction of a revolution indicating disk has indicia thereon to indicate the fraction of a revolution of the spindle and the opening in said cover is of such a shape and size to expose only one number at a time on the revolution indicating disk.

8. The combination as set forth in claim 1 including means to lock the spindle against rotation at any desired setting thereof.

9. An indicating dial comprising the combination of a base, a spindle rotatably mounted on said base, a gear rotatably mounted on said base adjacent said spindle, a revolution indicating disk mounted on and rotatable with said gear, a single tooth extending radially outwardly from said spindle and adapted to intermesh with the teeth of said gear, said tooth being of a width less than the width of the spaces between the teeth of said gear, a fraction of a revolution indicating disk mounted on and rotatable with said spindle, a substantially U-shaped pawl pivotally mounted on said base adjacent said gear, a tooth on each end of said pawl, and spring means normally urging one of said pawl teeth between the teeth of said gear, said other pawl tooth being movable between the teeth of said gear when said one pawl tooth is urged from between the gear teeth upon rotation of said gear.

References Cited in the file of this patent

UNITED STATES PATENTS

| | | |
|---|---|---|
| 467,796 | Ferrell | Jan. 26, 1892 |
| 875,037 | Aron | Dec. 31, 1907 |
| 1,985,652 | Campbell | Dec. 25, 1934 |
| 2,027,889 | Stewart | Jan. 14, 1936 |
| 2,746,417 | McCord | May 22, 1956 |
| 2,805,636 | Smith | Sept. 10, 1957 |
| 2,838,239 | Dom | June 10, 1958 |
| 2,901,998 | Keith | Sept. 1, 1959 |